Nov. 12, 1929.  D. W. SIGSWORTH  1,735,798
CHAIN FASTENER
Filed Dec. 15, 1928
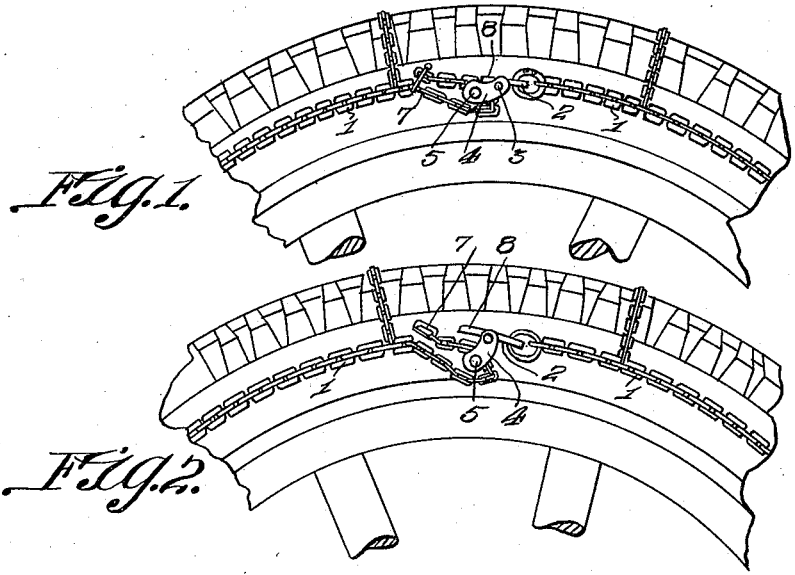
Fig.1.
Fig.2.
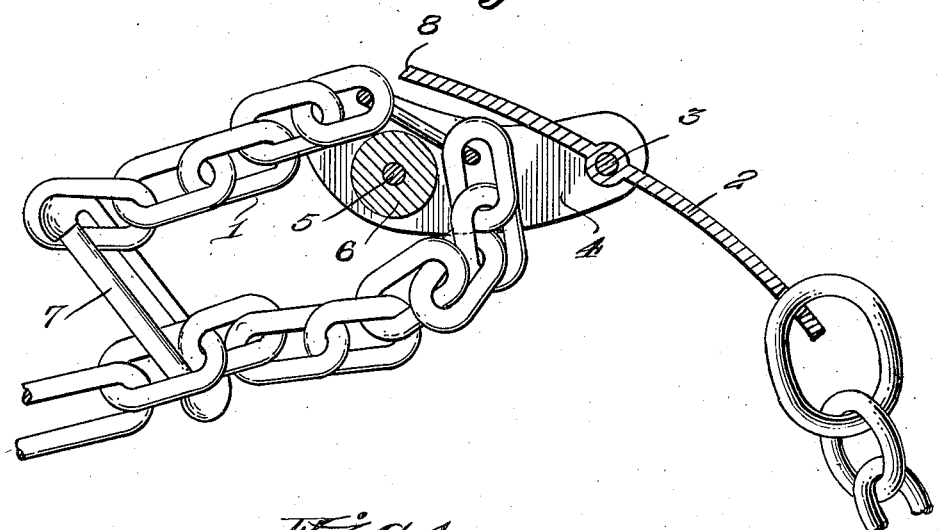
Fig.3.
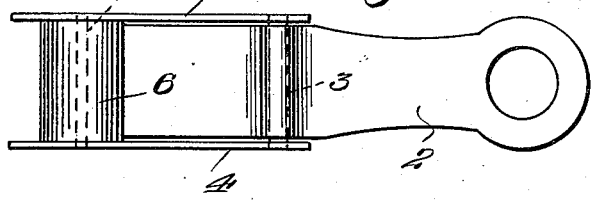
Fig.4.
Douglas W. Sigsworth,
INVENTOR
BY Victor J. Evans
ATTORNEY Patented Nov. 12, 1929

1,735,798

UNITED STATES PATENT OFFICE

DOUGLAS W. SIGSWORTH, OF EDMONTON, ALBERTA, CANADA

CHAIN FASTENER

Application filed December 15, 1928. Serial No. 326,287.

My present invention has reference to an anti-skid chain for automobiles and is particularly directed to a means, in the nature of a hitch, whereby the ends of the chains may be readily drawn taut, connected in an easy manner and held from rattling when arranged around the tire.

To the attainment of the foregoing the invention consists in the improvement hereinafter described and definitely claimed.

In the drawings:

Figure 1 is a fragmentary side elevation of an automobile wheel with my improvement arranged upon the anti-skid chain therefor.

Figure 2 is a similar view but showing the manner in which the chain is released.

Figure 3 is a greatly enlarged sectional view through the improvement showing the manner in which the chain is guided for attachment or detachment.

Figure 4 is a bottom plan view of the hitch.

The anti-skid chain to which my improvement is attached may be and preferably is of the ordinary nature although the links thereof, especially at the hooked end of the chain preferably are comparatively short. To one of the end links of the chain 1, I attach the chain gripping dog 2 of the improvement. The dog is in the nature of an arched plate that is centrally formed with a rounded enlargement that provides an eye through which passes a pivot 3 whereby the dog 2 is pivotally secured between the sides 4 of the body of the improvement. The plates constituting the sides 4 of the body are arched in an opposite direction to that of the dog 2, and between the side plates 4, adjacent to the ends thereof, opposite that provided with the pivot 3 there is a second pivot 5 on which there is journaled a roller 6.

It will be noted that there is a considerable distance between the roller 6 and the pivot 3 for the dog 2. Between this portion the second end of the chain is passed and the same is drawn over the roller until sufficiently taut and the attaching spring snap fastener 7, carried by one of the end links, is attached to another link of the chain. This movement of the chain around the roller will draw upon the second end of the chain, which latter causes the dog 2 to swing upon its pivot 3 and thus bring the active end 8 of the dog against one of the links that is arranged over the roller and consequently prevent this link and the remaining links at the end of the chain provided with the snap fastener 7 from rattling. Thus it will be noted that the active end of the dog engaging with the chain always keeps the said loose end of the said chain from knocking and should the dog have any tendency to move away from the chain, the said chain is held by the snap fastener. The chain can be tightened easily and quickly by pulling the snap end thereof and the dog, as above stated, automatically swings into link engaging position. The chain can be released and tightened with little effort by a pull upon the chain provided with the snap fastener which permits of the ready release of the snap fastener from the link of the chain engaged thereby.

Obviously the hitch is constructed of different sizes to suit different sizes and types of anti-skid chains and while I have herein shown and described a preferred embodiment of the improvement I do not wish to be restricted to the precise details herein shown and described.

Having described the invention, I claim:

1. The combination with an anti-skid chain for automobiles, of a dog loosely connected to one of the end links of a chain, spaced plates between which the dog is centrally pivoted, a roller journaled between the plates and spaced from the pivot of the dog to provide a passage for the snap end of the chain, as and for the purpose set forth.

2. A hitch for anti-skid chains comprising a roller carrying member over which the snap end of the chain is guided and a pivoted dog secured to the member and attached to the second end of the chain designed to be swung when the chain is drawn taut to bring its active end into contact with one of the links which have been drawn over the roller.

In testimony whereof I affix my signature.

DOUGLAS W. SIGSWORTH.